United States Patent [19]

Jovanovic et al.

[11] Patent Number: 4,931,716

[45] Date of Patent: Jun. 5, 1990

[54] CONSTANT FREQUENCY ZERO-VOLTAGE-SWITCHING MULTI-RESONANT CONVERTER

[76] Inventors: Milan Jovanovic, 852 Hutcheson Dr., Blacksburg, Va. 24060; Richard Farrington, 310 Hillcrest Hall, Blacksburg, Va. 24061; Fred C. Lee, 2909 Stradford La., Blacksburg, Va. 24060

[21] Appl. No.: 347,853

[22] Filed: May 5, 1989

[51] Int. Cl.$^5$ .................................. G05F 1/46
[52] U.S. Cl. ........................ 323/285; 323/224; 323/271
[58] Field of Search ........... 323/222, 224, 282, 283, 323/284, 285, 268, 271

[56] References Cited

U.S. PATENT DOCUMENTS

4,720,668 1/1988 Lee et al. ........................ 323/271
4,727,308 2/1988 Huljak et al. .................... 323/222
4,833,584 5/1989 Divan ............................. 363/98

*Primary Examiner*—Peter S. Wong

[57] ABSTRACT

A zero-voltage multi-resonant converter that operates at constant frequency. In the zero-voltage multi-resonant converter, the resonant circuit is formed in a $\pi$-network with resonant capacitors connected in parallel with the switches. In practicing the present invention, certain rules are applied to derive a CF ZVS-MRC from a PWM converter. In particular, one resonant capacitor is placed in parallel with the active switch, which may be either uni-directional or bi-directional, the rectifying switch is replaced by another active switch, which may also be uni-directional or bi-directional, another resonant capacitor is placed in parallel with the other active switch, and an inductor is inserted in the loop containing the two switches. This loop can also contain voltage sources and filter or blocking capacitors.

11 Claims, 5 Drawing Sheets

$T_s$ = CONSTANT PERIOD
$T_{on}$ = VARIABLE ON-TIME OF $S_2$ DRIVE

CONSTANT FREQUENCY ZERO-VOLTAGE-SWITCHING MULTI-RESONANT CONVERTER

FIELD OF THE INVENTION

The present invention relates to constant frequency multi-resonance converters, in general, and to constant frequency zero-voltage-switched multi-resonance converters, in particular.

BACKGROUND OF THE INVENTION

High-frequency power conversion offers higher power density and faster transient response. To operate at higher frequency, it is necessary to minimize switching losses. The zero-current-switching technique has been demonstrated to achieve high-frequency, high-efficiency operation for quasi-resonant converters. In the zero-current-switched quasi-resonant converters (ZCS-QRCs), the current of the transistor is shaped by a resonant network, so that it is reduced to zero prior to turn-off to eliminate turn-off losses.

Although ZCS-QRCs can operate at relatively high frequencies, several limitations exist. The maximum switching frequency is limited to 1 to 2 MHz by the undesired capacitive turn-on loss. Here the energy stored in the junction capacitance of the MOSFET is dissipated into the device during turn-on. Furthermore, the switching frequency for lighter loads is significantly reduced, resulting in lower crossover frequency and slower transient response. This is particularly true when the converter is operated in half-wave mode. The frequency range and transient response can be improved by operating a converter in full-wave mode. However, full-wave mode is difficult to implement at high frequencies due to the slow recovery of the MOSFET's body diode.

See U.S. Pat. No. 4,720,667 (Lee et al) for several examples of zero-current-switched quasi-resonant converters.

The ZVS technique has been proposed to overcome the limitations of the ZCS technique. Switching turn-on losses of the power switches are eliminated by shaping the transistor's voltage waveform so that the voltage reduces to zero prior to turn-on. This enables the ZVS-QRCs to operate up to and beyond 10 MHz. Contrary to the ZCS-QRCs, the switching frequency of ZVS-QRCs is increased at light loads. Thus, it is possible to implement converters with high cross-over frequencies and much improved dynamic responses.

One common drawback of the ZVS technique when applied to single-ended converter topologies is the inherent high-voltage stress across the switching transistor. Therefore, practical converter topologies for off-line applications are those that employ multiple switches such as push-pull and bridge-type topologies where the voltage across the off switch is automatically clamped by the conduction of its complementary switch. To maintain the desired zero-voltage-switching property for a wide range of input voltage and load, the ZVS-QRC requires a wide frequency range. Full-wave mode of operation, which can be achieved by adding a diode in series with each switch, is not practical because the series diode hinders the transfer of charge stored in the transistor's output capacitance to the external circuits. Thus, the MOSFETs no longer achieve a true zero-voltage-switching.

See U.S. Pat. No. 4,720 668 (Lee et al) for several examples of zero-voltage-switched quasi-resonant converters.

In ZVS-QRCs, the freewheeling diodes are operated under zero-current-switching conditions. Since the junction voltages are abruptly changed during switching, the junction capacitances tend to oscillate with the resonant inductance resulting in high-frequency ringing and power dissipation.

Figure 1A:
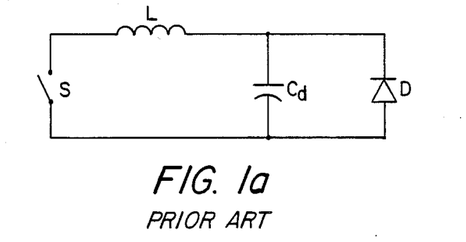
FIG. 1a is a schematic diagram of a circuit for a zero-current quasi-resonant switch.
Figure 1B:
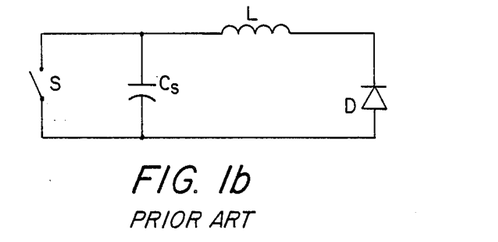
FIG. 1b is a schematic diagram of a circuit for a zero-voltage quasi-resonant switch.

FIGS. 1a and 1b show the circuits of prior art zero-current and zero-voltage quasi-resonant switches Each of these topologies represents a high-frequency subcircuit extracted from a quasi-resonant converter by replacing voltage sources and filter capacitors with short circuits and filter inductor with open circuits. In the equivalent circuit of the zero-current quasi-resonant switch, shown in FIG. 1a, the active switch S operates in series with the resonant inductor L while the diode D operates in parallel with the resonant capacitor $C_D$. In the zero-voltage quasi-resonant switch shown in FIG. 1b, the situation is opposite. The active switch S is in parallel with the capacitor $C_S$ and the diode D is in series with the inductor L. It can be easily seen that the two topologies are dual.

The performances of ZVS-QRCs can be drastically improved by the introduction of the multi-resonant technique. This technique enables both the active switches (power MOSFETs) and the passive switches (diodes) to operate with zero-voltage-switching. For the class of zero-voltage-switched multi-resonant converters (ZVS-MRCs), junction capacitances of all semiconductor devices are utilized to form a multi-resonant network. This technique minimizes parasitic oscillations of all forms and is capable of achieving zero-voltage-switching even at no-load.

See U.S. patent application Ser. No. 99,965, filed Sept. 23, 1987; U.S. patent application Ser. No. 179,926, filed Apr. 11, 1988; and U.S. patent application Ser. No. 249,930, filed Sept. 27, 1988, which are incorporated herein by reference, for several examples of zero-voltage-switched multi-resonant converters.

Although the frequency range of ZVS-MRCs is smaller than that of the corresponding ZVS-QRCs, a wide-band frequency modulation is still required. As a result, the design of magnetic components and EMI filters may be difficult. Also, the bandwidth of a closed-loop control is compromised since it is determined by the minimum switching frequency. To benefit from high-frequency of operation to its fullest extent, it would be desirable to operate the converters with constant frequency.

Figure 2:
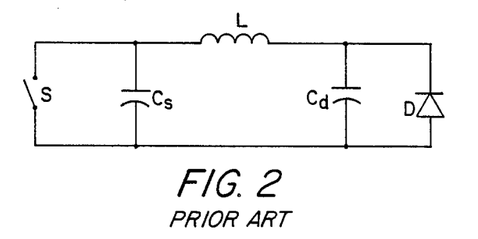
FIG. 2 is a schematic diagram of a circuit for a zero voltage multi-resonant switch.

The ZCS-QRC and ZVS-QRC families have been derived from the pulse width modulation (PWM) converter family by replacing the PWM switch with quasi-resonant switches shown in FIGS. 1a and 1b. By replacing the PWM switch with a multi-resonant switch as shown in FIG. 2, the family of ZVS multi-resonant converters (MRCs) is generated. In the circuit of the ZVS-MRC shown in FIG. 2, the active switch S operates in parallel with the capacitor $C_S$ and in series with the resonant inductor L while the diode D operates in parallel with the capacitor $C_D$ and in series with the resonant inductor L.

It should be noted that both the quasi-resonant switch and the multi-resonant switch use the combination of active and passive switches. As a result, no direct control of power flow through the passive switch is possible. The power delivered from source to load is determined by the duration of on time, i.e., the duration the source is connected to the output. To control output power in the ZCS-QRCs, which operates with constant on time, it is necessary to vary the switching frequency by varying the off time of the switch. In the ZVS-QRCs and ZVS-MRCs, power control is achieved by varying the on-time duration. However, the control of output power by variation of operating frequency is undesirable for many applications.

There is thus a need for a resonant switching network in which the control of output power is achieved with fixed frequency operation. The present invention is directed toward filling that need.

SUMMARY OF THE INVENTION

It is thus an object of the invention to provide a resonant switching network in which the control of output power is achieved with fixed frequency operation.

This and other objects of the invention are achieved by provision of a multi-resonant converter having two active switches. In a constant frequency zero-voltage multi-resonant switch, the resonant circuit is formed in a $\pi$-network with resonant capacitors connected in parallel with the two active switches.

In practicing the present invention, certain rules are applied to derive a constant frequency ZV-MRC from a PWM converter. In particular, one resonant capacitor is placed in parallel with the active switch, the passive switch (diode) is replaced by another active switch, another resonant capacitor is placed in parallel with the other active switch, and an inductor is inserted in the loop containing the two active switches. This loop can also contain voltage sources and filter or blocking capacitors.

A better understanding of the invention will be achieved when the following detailed description is read in connection with the following drawings.

BRIEF DESCRIPTION OF THE DRAWINGS

FIGS. 10a, 10b and 10c show the measured waveforms for the buck ZVS-MRC of FIG. 7a.

DETAILED DESCRIPTION OF THE PREFERRED EMBODIMENTS

In describing the preferred embodiments of the subject invention illustrated in the drawings, specific terminology will be resorted to for the sake of clarity. However, the invention is not intended to be limited to the specific terms so selected, and it is to be understood that each specific term includes all techniCal equivalents which operate in a similar manner to accomplish a similar purpose.

Figure 3:
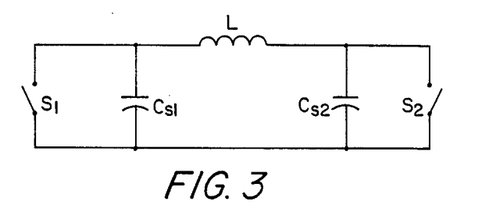
FIG. 3 is a schematic diagram of a circuit for a zero voltage constant frequency multi-resonant switch.

In the constant frequency multi-resonant switch according to the invention, the constant frequency of operation is achieved by replacing the passive switch (diode) in the original multi-resonant switch with an active switch (transistor). For example, if the passive switch (diode) D of the ZVS-MRC shown in FIG. 2 is replaced by a second active switch $S_2$ as shown in FIG. 3, output power can be controlled at constant frequency.

The procedure for converting any PWM topology will now be described in connection with a specific design with the realization that the concepts may be applied to several types of pulse-width-modulated topologies. By way of example, to drive a constant frequency ZVS-MRC from a PWM converter, the following steps are applied:

1. One resonant capacitor is placed in parallel with the active switch, which may be either uni-directional or bi-directional.

2. The passive switch (diode) is replaced by another active switch.

3. Another resonant capacitor is placed in parallel with the other active switch, which may also be either uni-directional or bi-directional.

4. An inductor is inserted in the loop containing the two active switches. This loop can also contain voltage sources and filter or blocking capacitors.

Applying the above rules to six basic converter topologies (buck, boost, buck-boost, Cuk, SEPIC, and Zeta), the corresponding CF ZVS-MRC topologies, shown in FIGS. 7a through 7f, are obtained. In a similar manner following the same rules, six transformer isolated CF ZVS-MRCs, shown in FIGS. 8a through 8f, can be generated from the six basic converter topologies. In all of FIGS. 7a through 7f and 8a through 8f, like reference numerals and letters refer to like parts which function in like manner. $V_s$ represents the voltage source, $S_1$ and $S_2$ the first and second active switches, $C_{s1}$ and $C_{s2}$ the capacitances of switches $S_1$ and $S_2$, respectively, L the resonant inductor, $L_f$ and $C_f$ the filter inductor and capacitor, respectively, and R the load resistance. In all the isolated converters of FIGS. 8a through 8f, the resonant inductance can be supplied by the leakage inductance of the transformer. It should also be noted that in the isolated CF ZVS-MRCs, the resonance of the switch currents is achieved using the secondary-side resonance of the transformer.

Figure 4:
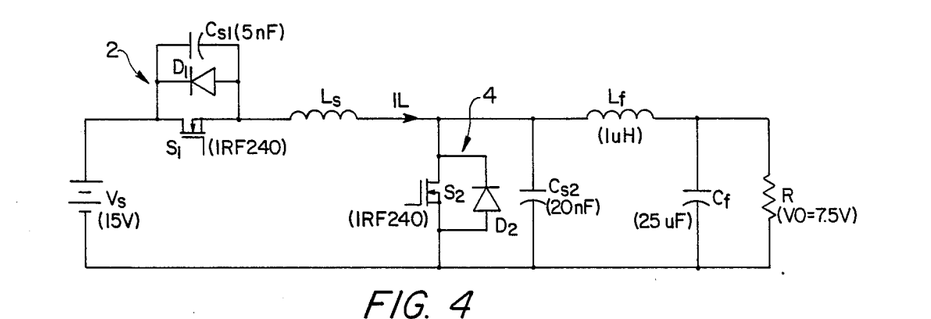
FIG. 4 is a schematic diagram of a circuit for a constant frequency multi-resonant buck converter (CF ZVS-MRC).
Figure 9A:
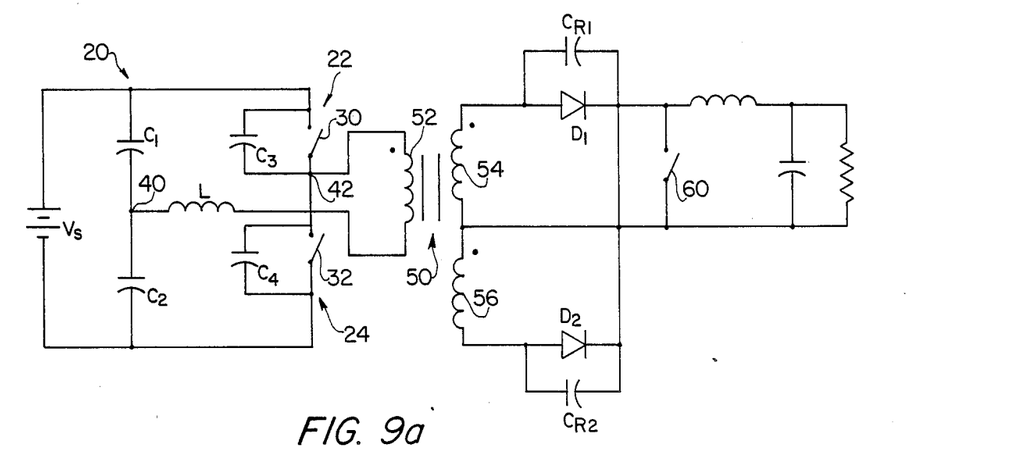
FIGS. 9a and 9b are schematic diagrams of two variations of topologies for constant frequency half-bridge ZVS-MRC's.
Figure 10A:
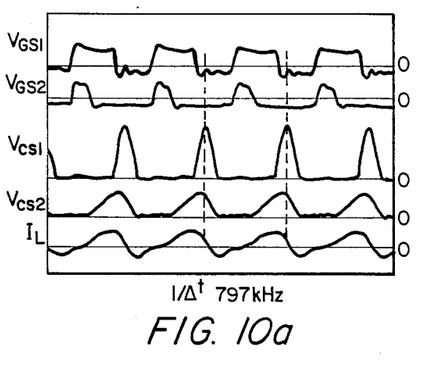
Figure 10B:
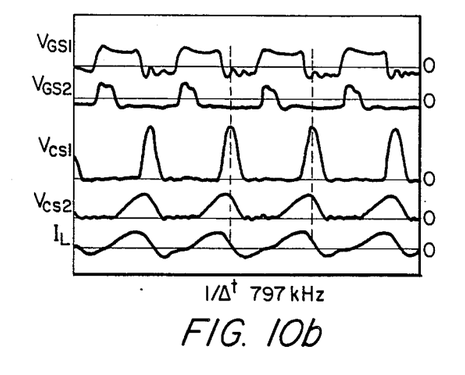
Figure 10C:
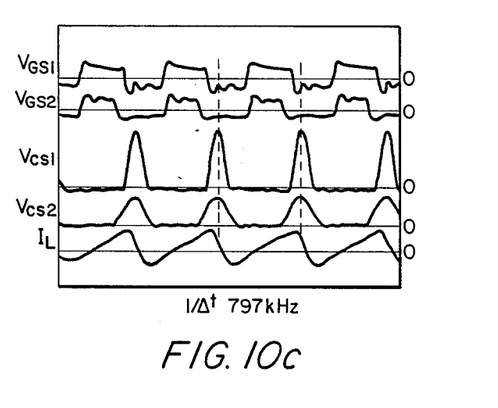

Although a large variety of MRCs exists, their operation and characteristics are generally similar. For this reason, the buck CF ZVS-MRC topology of FIG. 9a is analyzed to gain insight in the operation and performance of CF ZVS-MRCs. FIG. 4 shows a circuit diagram of the converter, whereas FIGS. 10a through 10c show the circuit's typical measured waveforms for different loads.

The two-switch CF buck ZVS-MRC shown in FIG. 4 is obtained by replacing the PWM switch in a buck PWM converter with the CF multi-resonant switch of FIG. 3. In the circuit of FIG. 4, a voltage source $V_s$ is connected in series with two switching assemblies 2 and 4 which, in turn, are connected in series. First switching assembly 2 consists of a transistor $S_1$ in parallel with a diode $D_1$ and a capacitor $C_{s1}$. Second switching assembly 4 consists of a transistor $S_2$ in parallel with a diode $D_2$ and a capacitor $C_{s2}$. In a preferred embodiment, each of the transistor switches $S_1$ and $S_2$ are made up of a MOSFET. A resonant inductor $L_s$ is connected in series in the loop with switches $S_1$ and $S_2$ which are in turn connected through series filter inductor $L_f$ to a parallel arrangement of a filter capacitor $C_f$ and resistor R.

In the specific embodiment of the circuit of FIG. 4, voltage source $V_s$ has a voltage of 15 V, capacitors $C_{s1}$ and $C_{s2}$ have a capacitance of 5 mF and 20 mF, respectively, resonant inductor $L_s$ has an inductance of 800 nH filter inductor $L_f$ has an inductance of 1 uH, and filter capacitor $C_f$ has a capacitance of 25 uF.

Figure 5:
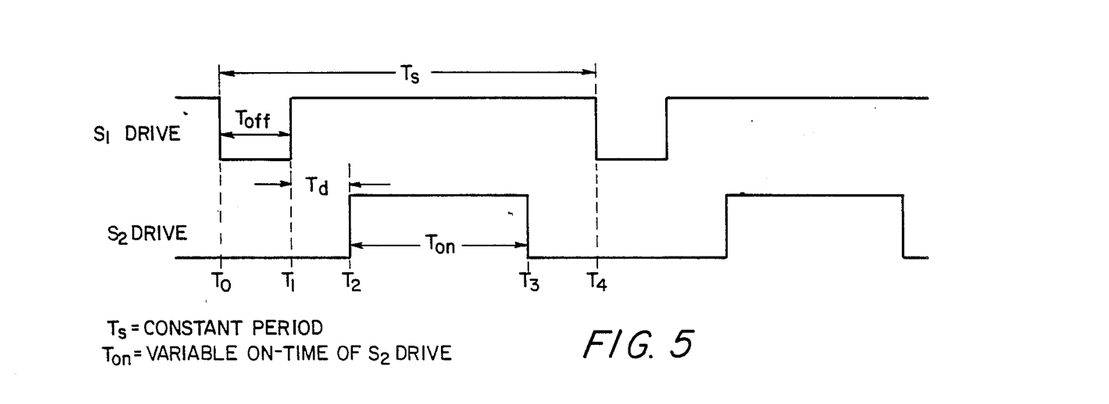
FIG. 5 shows the gate drive waveforms for the $S_1$ and $S_2$ drives of the buck CF ZVS-MRC of FIG. 4.
Figure 6:
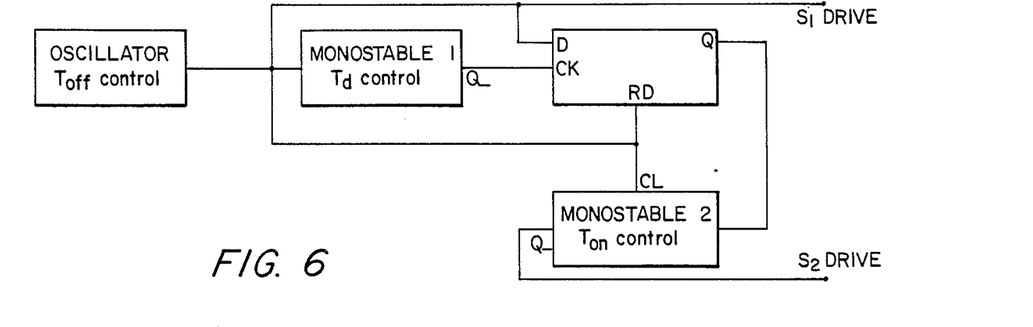
FIG. 6 is a block diagram of the gate drive of the circuit of FIG. 4.
Figure 7A:
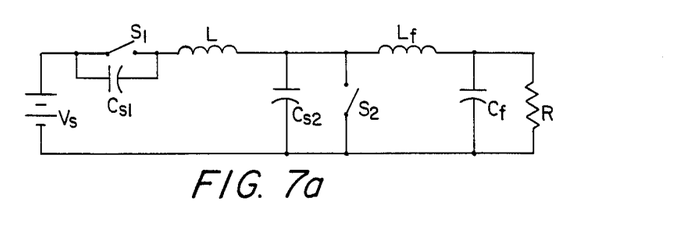
FIGS. 7a through 7f are schematic diagrams of six basic topologies for CF ZVS-MRCs.
Figure 7B:
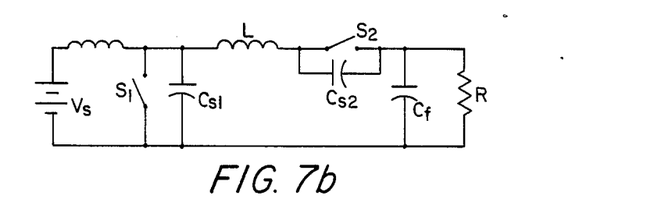
Figure 7C:
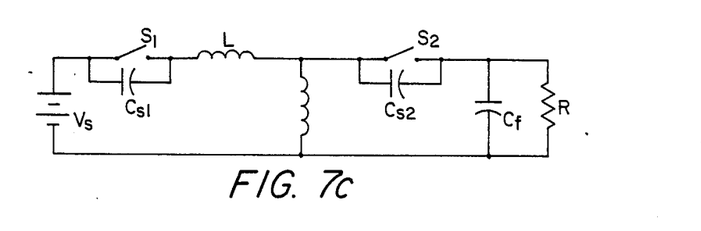
Figure 7D:
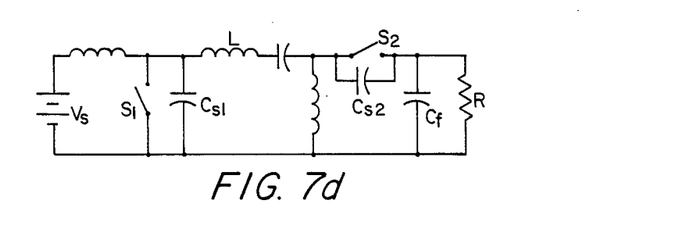
Figure 7E:
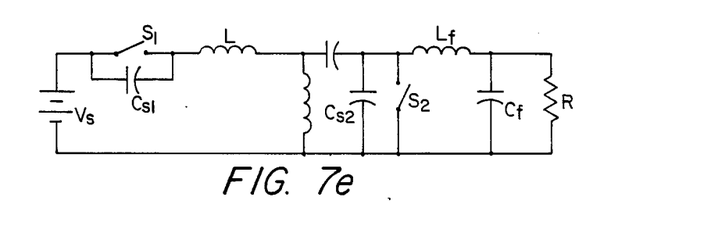
Figure 7F:
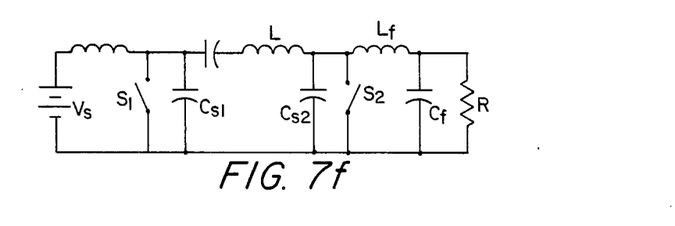
Figure 8A:
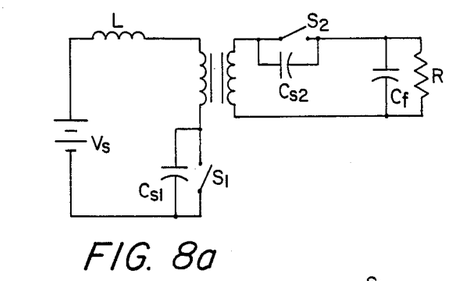
FIGS. 8a through 8f are schematic diagrams of six basic isolated topologies for CF ZVS-MRCs.
Figure 8B:
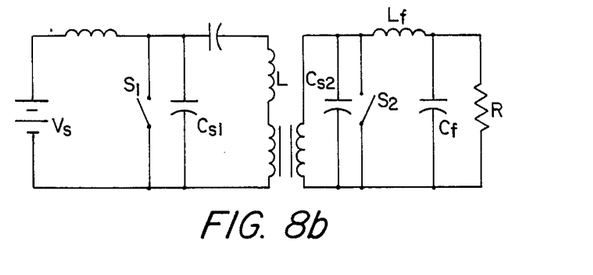
Figure 8C:
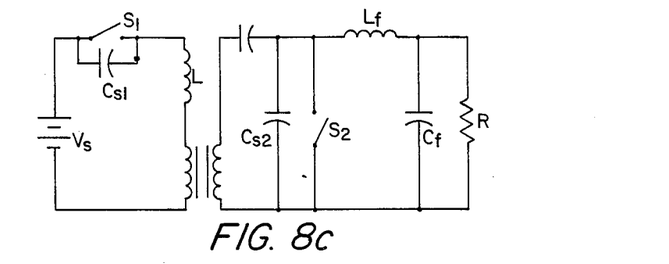
Figure 8D:
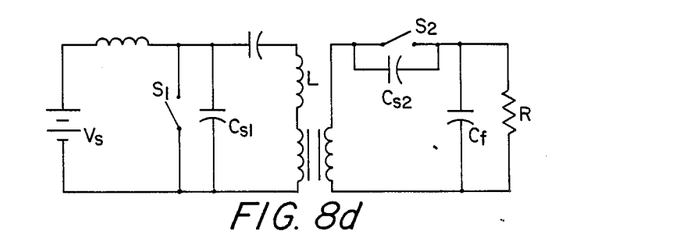
Figure 8E:
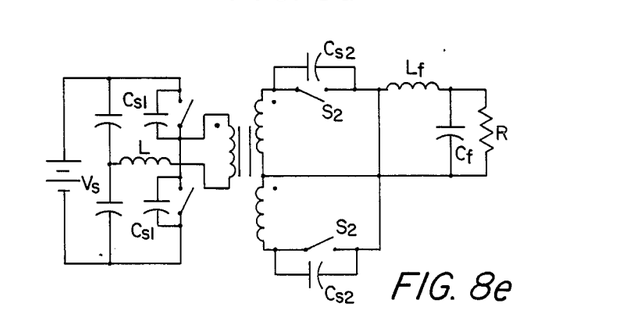
Figure 8F:
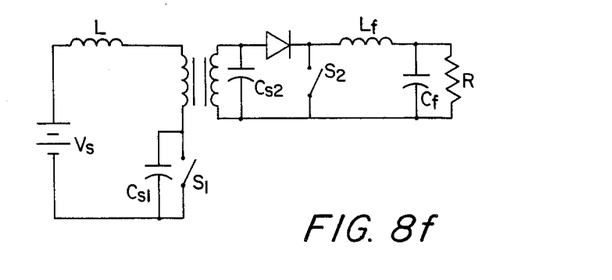

A conceptual block diagram of the driver and the drive waveforms of the converter of FIG. 4 are shown in FIGS. 6 and 5, respectively. Switch $S_1$ operates with a constant switching frequency ($f_s = 1/T_s$) and constant off time ($T_{off}$). Switch $S_2$ operates with variable on time ($T_{on}$) and provides the control of output power.

The operation of the converter in FIG. 4 is as follows When switch $S_1$ turns off ($t = T_0$), switch $S_2$ is already off, and resonant inductor $L_s$ resonates with $C_{s1}$ and $C_{s2}$. As a result, the voltage across $S_1$ reaches zero through a resonant oscillation. At the same time, the current through $L_s$, which is negative, starts flowing through the anti-parallel diode of $S_1$. Also, the current through $S_2$ is negative and flows through the anti-parallel diode of switch $S_2$. To achieve zero-voltage turn on, $S_1$ and $S_2$ should be turned on while their currents flow through their anti-parallel diodes.

In FIG. 5, $S_1$ is turned on at $t = T_1$ and $S_2$ at $t = T_2$, i.e., the turning on of $S_2$ is delayed for $t = T_d$. However, both switches can be turned on simultaneously. When both switches are on, the current through $L_s$ increases linearly since the constant input voltage appears across $L_s$. During this period, the source is effectively disconnected from the load and no power is transferred to the output. Power transfer begins when switch $S_2$ is turned off at $t = t_3$ and $L_s$ and $C_{s2}$ start to resonate. The average output voltage is equal to the average voltage of $C_{s2}$. For a varying load current, the average voltage across $C_{s2}$ is maintained by modulating the conduction time of $S_2$. For heavy loads, this time is minimum and increases as the load decreases. In other words, at heavy loads the source is disconnected from the output for a shorter time than at light loads.

Figure 9B:
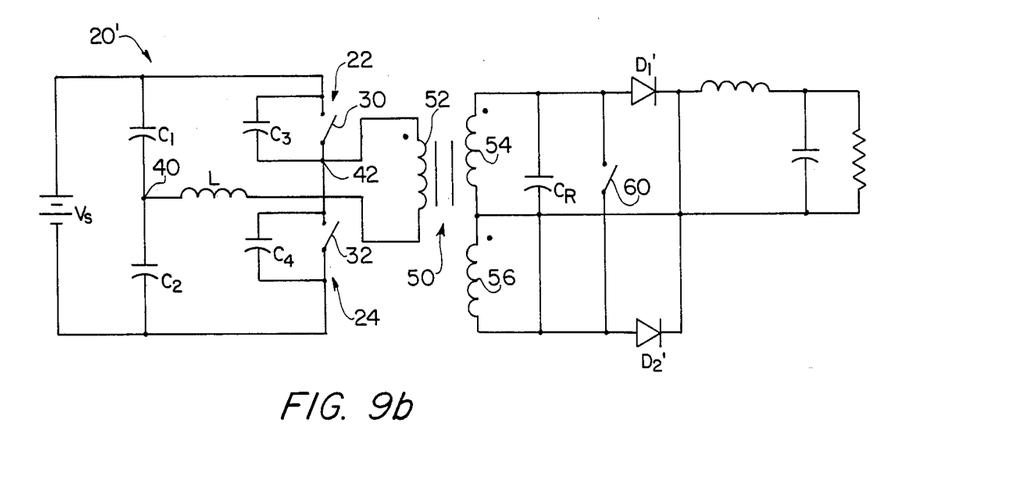

It should be noted that the bridge-type CF ZVS-MCR can be implemented in different ways in accordance with the invention as shown in FIGS. 9a and 9b for a half-bridge converter.

FIG. 9a shows a first embodiment of a half-bridge zero-voltage-switched multi-resonant converter (half-bridge ZVS-MRC) 20 embodying the teachings of the present invention. In a preferred embodiment, a voltage source $V_s$ is connected in parallel with capacitors $C_1$ and $C_2$ which represent the input capacitance and are arranged in series. The voltage supply is also connected in parallel with two switching assemblies 22 and 24 which, in turn, are connected in series. Top switching assembly 22 consists of an active switch 30 in parallel with a capacitor $C_3$. Bottom switching assembly 24 consists of an active switch 32 in parallel with a capacitor $C_4$. In a preferred embodiment, each of the active switches 30 and 32 include metal oxide semiconductor field effect transistor (MOSFET).

Capacitors $C_1$ and $C_2$ share a common connection at node 40. In turn, switches 30 and 32 share a common connection at node 42. The primary winding 52 of a transformer 50 is connected across nodes 40 and 42. The transformer contains two secondary windings 54 and 56. Secondary windings 54 and 56 are connected through series rectifying diodes $D_1$ and $D_2$ to a filter inductor $L_f$ and the parallel arrangement of active switch 60, filter capacitor $C_f$, and load resistance R.

Resonant capacitors $C_3$ and $C_4$ represent the internal output capacitance of the MOSFET switches and any external resonant capacitances in parallel with them. Also note that the MOSFET switches have anti-parallel body diodes. L is the total inductance of the primary consisting of the leakage inductance of transformer 50 and an external resonant inductance if necessary. Resonant capacitor $C_{R1}$ is in parallel with rectifying diode $D_1$, whereas resonant capacitor $C_{R2}$ is in parallel with rectifying diode $D_2$.

A second embodiment of a half-bridge ZVS-MRC 20' is shown in FIG. 9b. In half-bridge ZVS-MRC 20', the voltage source $V_{s1}$ capacitors $C_1$ and $C_2$, switching assemblies 22 and 24, and transformer 50 are connected to each other as in half-bridge ZVS-MRC 20 shown in FIG. 9a. However, half-bridge ZVS-MRC 20' uses an alternative way of resonant connecting the resonant capacitors and active switch. A single equivalent capacitor $C_R$ and an active switch 60' are placed in parallel across the secondary windings of transformer 50 (i.e., between the anodes of $D_1'$ and $D_2'$). Secondary windings 54 and 56 of transformer 50 are then connected through series rectifying diodes $D_1'$ and $D_2'$ to filter inductor $L_f$ and the parallel arrangement of filter capacitor $C_f$ and load resistance R.

To implement the circuit in FIG. 9b, it is necessary to have "true" bi-directional switches (controllable in both directions). In practice they can be implemented by a series connection of two MOSFETs in opposition.

FIGS. 10a, 10b, and 10c show the measured waveforms of the experimental buck converter of FIG. 4 for a full-load (FIG. 10a), a 50% full-load (FIG. 10b), and no-load (FIG. 10c). The following waveforms are shown, from top to bottom, in each of FIGS. 10a, 10b, and 10c: gate-to-source voltages of $S_1$ ($V_{GS1}$) and $S_2$ ($V_{GS2}$), voltages across capacitors $C_{S1}$ ($V_{cs1}$) and $C_{s2}$ ($V_{cs2}$), an resonant-inductor current ($I_L$). The converter was designed for a 15 V input and 7.5 V output with a maximum load current of around 1.5 A. As can be seen, the converter regulates the output voltage from no-load (0 A) to full-load (1.37 A) with a constant switching frequency of approximately 0.8 MHz. The measured efficiency is tabulated in the Table below. It has been observed that the stress in the CF ZVS-MRCS are similar to those in the ZVS-MRCs. The components of the power stage, which are given in parentheses in FIG. 4, are described below.

TABLE

| Measured Efficiency of Experimental CF Buck ZVS-MRC | | | | |
|---|---|---|---|---|
| $V_s[V]$ | $I_s[A]$ | $V_o[V]$ | $I_o[A]$ | n[%] |
| 15.2 | 0.90 | 7.67 | 1.32 | 74.2 |
| 15.3 | 0.84 | 7.69 | 1.20 | 72.1 |
| 15.3 | 0.82 | 7.67 | 1.10 | 67.1 |
| 15.4 | 0.77 | 7.66 | 1.00 | 64.8 |
| 15.4 | 0.74 | 7.53 | 0.90 | 59.6 |
| 15.4 | 0.68 | 7.43 | 0.80 | 56.7 |

TABLE-continued

| Measured Efficiency of Experimental CF Buck ZVS-MRC | | | | |
|---|---|---|---|---|
| $V_s[V]$ | $I_s[A]$ | $V_o[V]$ | $I_o[A]$ | n[%] |
| 15.5 | 0.59 | 7.59 | 0.59 | 49.5 |
| 15.5 | 0.42 | 7.57 | 0.30 | 34.6 |
| 15.6 | 0.31 | 7.61 | 0.00 | 0.0 |

Figure 11A:
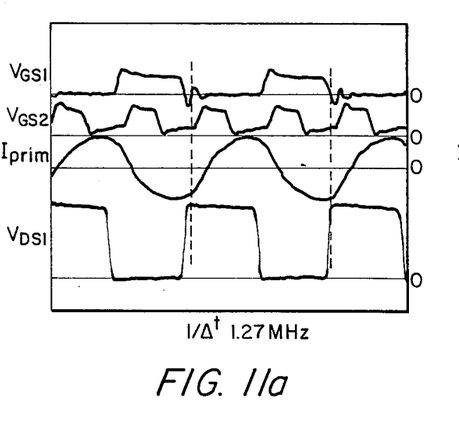
FIGS. 11a and 11b show the measured waveforms for the half-bridge CF ZVS-MRC of FIG. 9b.
Figure 11B:
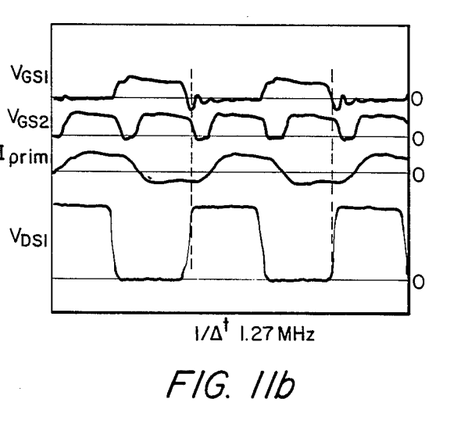

FIGS. 11a and 11b show the measured waveforms of the CF half-bridge ZVS-MRC of FIG. 9a for a full-load (5 V/10 A) and no-load (5 V/10 A). The following waveforms are shown, from top to bottom, in both of FIGS. 11a and 11b: gate-to-source voltage of $S_1$ ($V_{Gs1}$), gate-to-source voltage of $S_2$ ($V_{Gs2}$), primary current ($I_{prim}$), and drain-to-source voltage of the second primary switch ($V_{DS1}$). The converter was designed for an input voltage of 120 VDC. The measured efficiency of the converter at full-load was 80.3%.

From the above, it is apparent that many modifications and variations of the present invention are possible in light of the above teachings. It is therefore to be understood that, within the scope of the appended claims, the invention may be practiced otherwise than as specifically described.

What is claimed is:

1. A constant frequency zero-voltage-switched resonant switch, comprising:
   first switching means operative in open and closed circuit positions;
   first resonant capacitor means in parallel with said first switching means;
   second switching means in series with said first switching means, said second switching means being operative in open and closed circuit positions, said first and second switching means forming a closed loop;
   second resonant capacitor means in parallel with said second switching means; and
   inductor means inserted in said closed loop for forming a resonant circuit with said first and second resonant capacitor means;
   wherein said first switching means is switched between said open and closed positions using a substantially constant frequency signal.

2. The converter of claim 1, wherein said first and second switching means each comprise a MOFSET.

3. A constant frequency zero-voltage-switched multi-resonant converter for receiving power from a voltage course and providing power to a load, optionally including a filtering inductor and capacitor, comprising:
   first and second switching means operative in open and closed positions;
   first resonant capacitor means in parallel with said first switching means;
   second resonant capacitor means in parallel with said second switching means; and
   inductor means for forming a resonant circuit with said first and second resonant capacitor means;
   wherein said first switching means is switched between said open and closed positions using a substantially constant frequency signal;

4. The converter of claim 3, wherein said inductor means includes first and second terminals and is inserted in series with said first and second resonant capacitor means, such that said first terminal of said inductor means is connected to said first resonant capacitor means, and said second terminal of said inductor means is connected to said second resonant capacitor means.

5. A constant-frequency zero-voltage-switched multi-resonant converter for providing power to a load, comprising:
   input voltage source means;
   first and second switching means operative in open and closed positions;
   first resonant capacitor means in parallel with said first switching means;
   second resonant capacitor means in parallel with said second switching means;
   inductor means for forming a resonant circuit with said first and second resonant capacitor means; and
   filter inductance means and filter capacitance means disposed between the resonant circuit and the load;
   wherein said first switching means is switched between said open and closed positions using a substantially constant frequency signal.

6. A method of manufacturing a constant-frequency zero-voltage-switched multi-resonant switch using as a basis a non-constant-frequency zero-voltage-switched multi-resonant switch comprising a first switching means in parallel with a first capacitor, a diode in parallel with a second capacitor, and an inductor in a loop with the first switching means, the method comprising:
   employing an active switch in a circuit position corresponding to said diode; and
   providing an input for a substantially constant frequency signal for switching the first switching means between open and closed positions.

7. A constant-frequency zero-voltage-switch multi-resonant switch manufactured by the method of claim 6.

8. A constant-frequency zero-voltage-switch multi-resonant switch for providing power to a load, comprising:
   a transformer means comprising a primary winding, and two secondary windings, each of the secondary windings comprising first and second ends, the second end of the first secondary transformer connected to the first end of the second transformer;
   first and second capacitor means connected in parallel to respective first and second diodes to form respective first and second combinations, the combinations connected, respectively, to the first end of the first secondary winding and the second end of the second secondary winding, the combinations connected in series; and
   a switching means, disposed parallel to the load, disposed between said first combination and a node between the secondary windings.

9. The constant-frequency zero-voltage-switch multi-resonant switch according to claim 8, further comprising a filter inductor and a filter capacitor between the switching means and the load.

10. A constant-frequency zero-voltage-switched multi-resonant switch for providing power to a load, comprising:
   a transformer means comprising a primary winding, and two secondary windings, each of the secondary windings comprising first and second ends, the second end of the first secondary transformer connected to the first end of the second transformer;
   switching means and capacitor means connected in parallel with each other, connected between the first end of the first secondary winding and the second end of the secondary winding; and
   two diode means connected in series with each other, but in parallel with said switching means and said capacitor means, a first node being formed between said two diode means;

wherein the load is substantially connected between the first node and a second node between the secondary windings.

11. The constant-frequency zero-voltage-switched multi-resonant switch according to claim 10, further comprising a filter inductor and a filter capacitor between the first diode means and the load.

* * * * *